United States Patent [19]

Watson

[11] Patent Number: 5,246,517
[45] Date of Patent: Sep. 21, 1993

[54] METHOD OF ALTERNATIVELY FASTENING A BANNER TO A FLAGSTAFF OR TO A SURFACE

[76] Inventor: Robert L. Watson, 2545 Vale Ct., Davidsonville, Md. 21035-1139

[21] Appl. No.: 811,862

[22] Filed: Dec. 23, 1991

[51] Int. Cl.⁵ .................. B29C 65/00; G09F 17/00
[52] U.S. Cl. .................................. 156/215; 40/218; 40/591; 40/594; 40/611; 116/173; 156/227; 156/249; 156/273.1
[58] Field of Search .......... 156/215, 216, 227, 249, 156/273.1; 40/218, 591, 594, 611; 116/173

[56] References Cited

U.S. PATENT DOCUMENTS

| | | | |
|---|---|---|---|
| 3,986,611 | 10/1976 | Dreher | 53/399 |
| 4,218,278 | 8/1980 | McMackin et al. | 156/215 |
| 4,601,255 | 7/1986 | Marcotti | 40/591 |
| 4,813,369 | 3/1989 | Moreland | 116/173 |
| 4,884,827 | 12/1989 | Kelley | 156/DIG. 5 |
| 4,921,277 | 5/1990 | McDonough | 40/316 |
| 4,992,121 | 2/1991 | Rubino | 156/273.1 |
| 5,035,760 | 7/1991 | Sirianno | 156/273.1 |

FOREIGN PATENT DOCUMENTS

| | | | |
|---|---|---|---|
| 730524 | 5/1955 | United Kingdom | 156/273.1 |
| 2089091 | 6/1982 | United Kingdom | 40/611 |
| 2131216 | 6/1984 | United Kingdom | 116/173 |

Primary Examiner—Caleb Weston
Assistant Examiner—Steven D. Maki
Attorney, Agent, or Firm—Oblon, Spivak, McClelland, Maier & Neustadt

[57] ABSTRACT

A method of securely attaching for indefinite periods banners of flexible plastic electrostatically chargeable material to flagstaffs and then onto smooth non-porous surfaces, which may be the painted exteriors of vehicle bodies, and vice versa, without the use of separate adhesives.

4 Claims, 4 Drawing Sheets

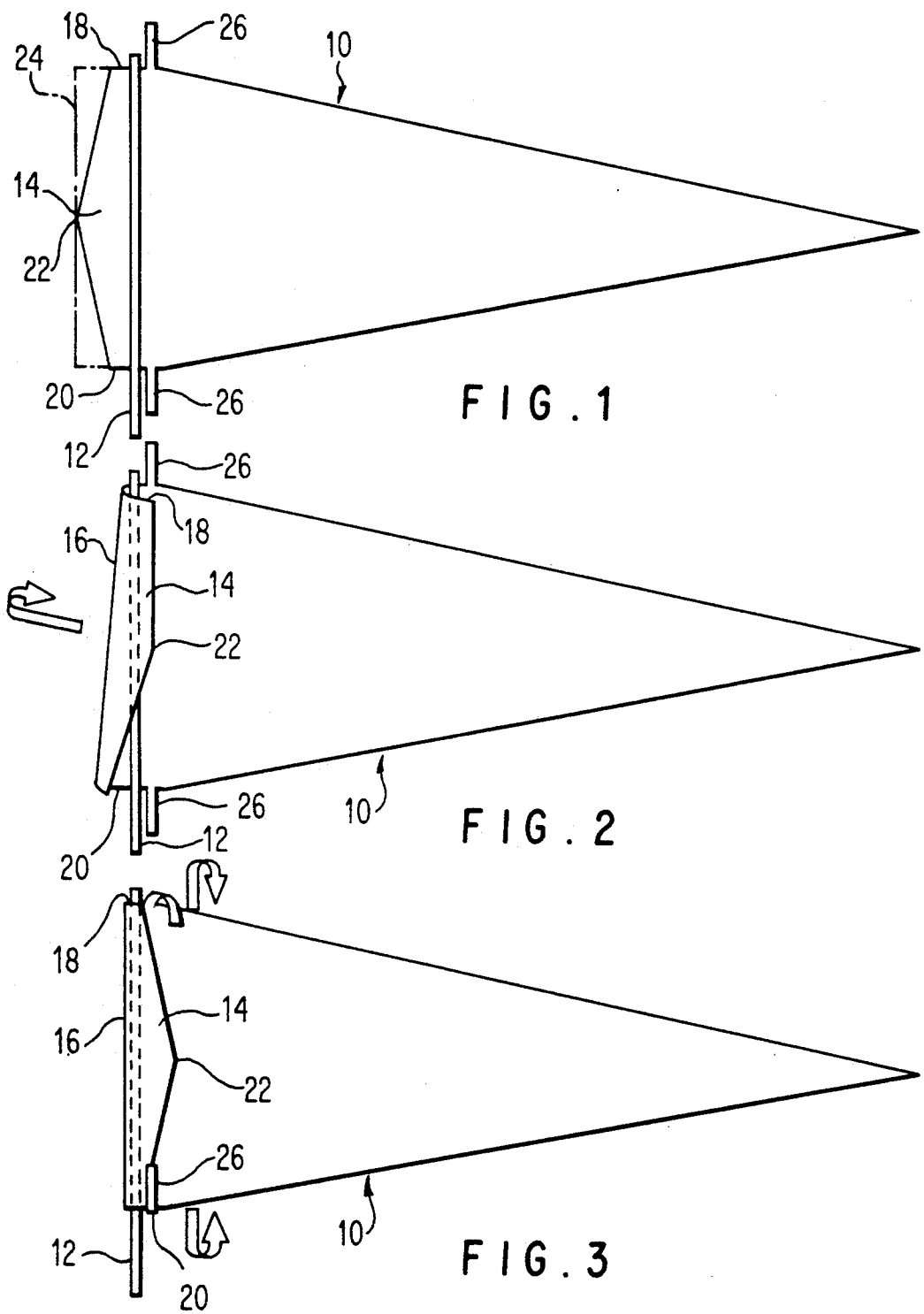

METHOD OF ALTERNATIVELY FASTENING A BANNER TO A FLAGSTAFF OR TO A SURFACE

FIELD OF THE INVENTION

This invention relates to banners and more particularly to a method of fastening a banner either to a flagstaff or to a smooth non-porous surface.

BACKGROUND OF THE INVENTION

For many years it has been customary to sell at athletic events banners or pennants bearing the name and colors of the home team. The banners are usually of cloth or felt stapled or tied to staffs but in common with all of them is the fact that they are intended to be used in only one significant manner and that is at the end of a flagstaff.

BRIEF DESCRIPTION OF THE INVENTION

The invention provides a method whereby a banner of specified material may be used not only on a flagstaff but alternatively as a display applied to a smooth, non-porous surface such as the exterior of an automobile, from which the banner may be easily removed without marring the surface and quickly reattached to the flagstaff.

Thus the broad object of the invention is to provide a method whereby a banner can be used in a conventional manner at the end of a flagstaff at a sporting event, say, but after the event the banner can be reused as a display on the side of an automobile, the method effecting a secure indefinite attachment of the banner either to the staff or to the automobile to withstand vigorous waving, on the one hand, or high relative wind speeds on the other hand.

DESCRIPTION OF THE DRAWINGS

FIGS. 1, 2 and 3 are side elevational views of a banner showing successive steps in attaching the banner to a flagstaff;

DETAILED DESCRIPTION OF THE INVENTION

Figure 4:
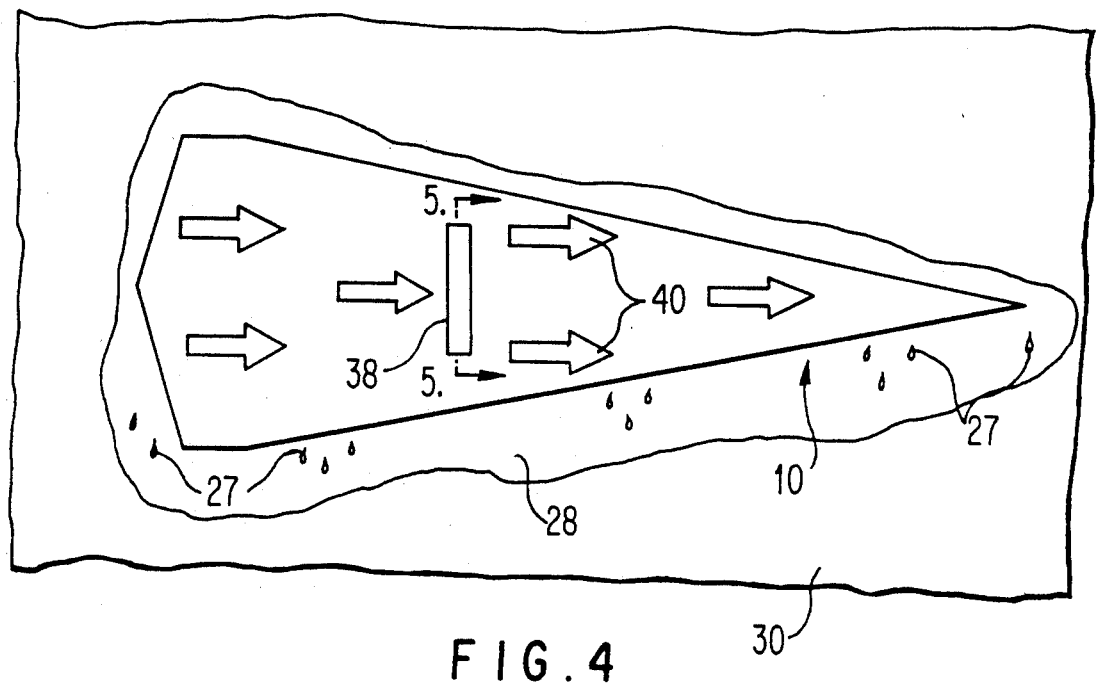
FIG. 4 is an elevational view of a surface with a banner being applied thereto.

Throughout the following description the word "banner" is used in connection with the unit which is to be attached either to a flagstaff or to a smooth non-porous surface. "Banner" should be taken to mean any flag, pennant, or emblem of any kind but composed of a material suited to the method of the invention. A material to meet the requirements of the invention must be of an electrostatically chargeable, flexible, polymeric sheet material or film having a surface characteristic such that when one ply of the material is applied to a second ply thereof and the plies manually squeezed together they cling to each other as a result of the inherent cohesiveness in the face-to-face surfaces of the material. The material also must be capable of clinging to a smooth non-porous surface after the material has been supplied with a static charge. Such a material, sold under the trademark "Penstick", is available from Molco Inc., of Waymart, Pa.

Referring now to the drawings and particularly to FIGS. 1, 2 and 3, the numeral 10 designates a typical banner which may be a pennant of the type defining generally an isosceles triangle. The banner is made of a material having the characteristics described immediately above and in accordance with the method of the invention is releasably attached to a flagstaff 12 in the following manner. The staff 12 is first engaged with an end part 14 of the banner as shown in FIG. 1. The end part 14 is then folded over the staff 12 and over itself to define a seam 16 encompassing the staff. Thereafter the over-lapping face-to-face portions of the seam 16 are manually squeezed together from immediately adjacent the staff transversely across the entire width of the seam.

Should the pennant be a pure isosceles triangle, the wide end part of the pennant could be folded around the staff as just described but this would result in a pair of upper and lower outwardly diverging ears extending above and below the edges of the pennant adjacent the staff. The ears could be folded down over the upper and lower edges of the pennant and squeezed against the pennant material in that region to increase the security of the connection of the pennant seam with the staff. Though this would be satisfactory, it can create a bunched-up appearance at the corners which can be avoided by cutting the upper and lower edges of the pennant adjacent its wide end so as to provide flats as shown at 18, 20. The staff would then be engaged with the pennant end about midway of the flats 18, 20 so that when the end part is folded over itself to define the seam 16 the folded-over parts of the flats register with each other as shown in FIG. 3.

It has been found that shaping the end edge of the pennant or other banner which is to be attached to a staff so that it defines a shallow point 22 as shown provides an effective seam, with the point 22 being easily lifted by a fingernail when the adhering portions of the seam are to be separated to detach the banner from the staff. Instead of being cut to define the shallow point 22 shown, the flats 18 and 20 can be continued further to the extent, say, of the point to provide more face-to-face contact area between the parts of the seam as indicated by the dot-dash lines 24 in FIG. 1.

To more securely fasten a banner to a staff, the flats 18, 20 at their inner ends may be provided with upstanding tabs 26 arranged to be folded across the outer ends of the seams and be adhered thereto by pressing. The tabs 26 are shown integral with the flats but they could be separate elements which may, for convenience, be adhered to the end flaps say, of the banner for storing and ready removal for subsequent adherence to the banner over the seam ends.

The method of the invention contemplates single or double use of the banners, as, for example, after a banner has been vigorously waved on its staff during an athletic event, at the conclusion of the event, the banner may be easily separated from the staff and applied to the exterior of any smooth non-porous surface, either glass or metal, such as the exterior of a vehicle without danger of blowing off yet is readily removable, without a trace, from the surface for reattachment to the staff for the next event.

Figure 5:
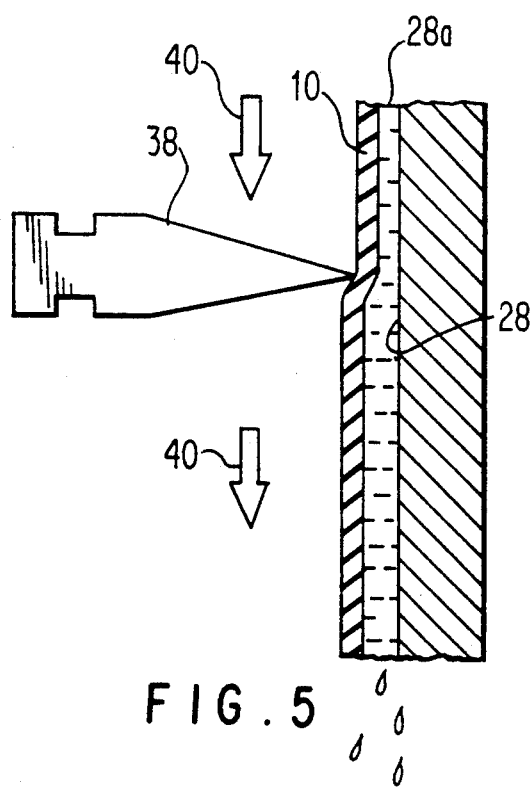
FIG. 5 is an enlarged cross-sectional view taken substantially on line 5-5 of FIG. 4 illustrating the method of adhering the banner material to a smooth non-porous surface in accordance with the invention.

Thus the invention includes the additional steps of manually separating the adhering portions of the seam 16 to separate the banner 10 from the staff 12. Thereafter and with reference to FIGS. 4 and 5, water, as indicated by the drops 27 in FIG. 4, is applied over an area 28 of a smooth, non-porous surface 30 which may be the exterior painted o molded body of the vehicle 36 shown in FIG. 9. The wetted area 28 is at least equal to the area of the banner 10 and, following this wetting step, one face of the banner 10 is applied to the wetted surface and thereafter a known squeegee tool 38, used, for example, in the process of permanently fixing by the use of adhesive, heat insulating plastic film to plate glass, is wiped over the outer surface of the banner as indicated by the arrows 40 in FIGS. 4 and 5. The tool, when rubbed over electrostatically chargeable sheet material of the type described above, has in the absence of the wetting step, the ability to electrostatically charge the material so that it will adhere for a limited period to a smooth non-porous surface. The applied charge, however, invariably leaks away over a relatively short period of time and the material, which may be in the form of a banner, drops to the ground.

In accordance with the invention I have discovered that when the surface is first wetted and the applied banner is then wiped with the squeegee until all air bubbles and all discernable water have been removed or squeezed from between the banner and the smooth surface, and the banner has become electrostatically charged, that it will remain in place indefinitely. I have also discovered that when the banner is applied to the exterior surface of a vehicle, be it glass or smooth nonporous painted body, the banner will remains in place when the relative wind flowing across the banner is about one hundred miles an hour. I do not know the upper limit of wind velocity that a banner could withstand since I have been unable to test it in a relative wind substantially higher than 100 miles per hour. I do know that when the banner and mounting surface are treated as above described the banner will remain in place on the surface indefinitely regardless of the wind yet can be easily removed without leaving a trace by simply lifting an edge part of the banner with a fingernail and thereafter peeling it off of the surface.

Figure 9:
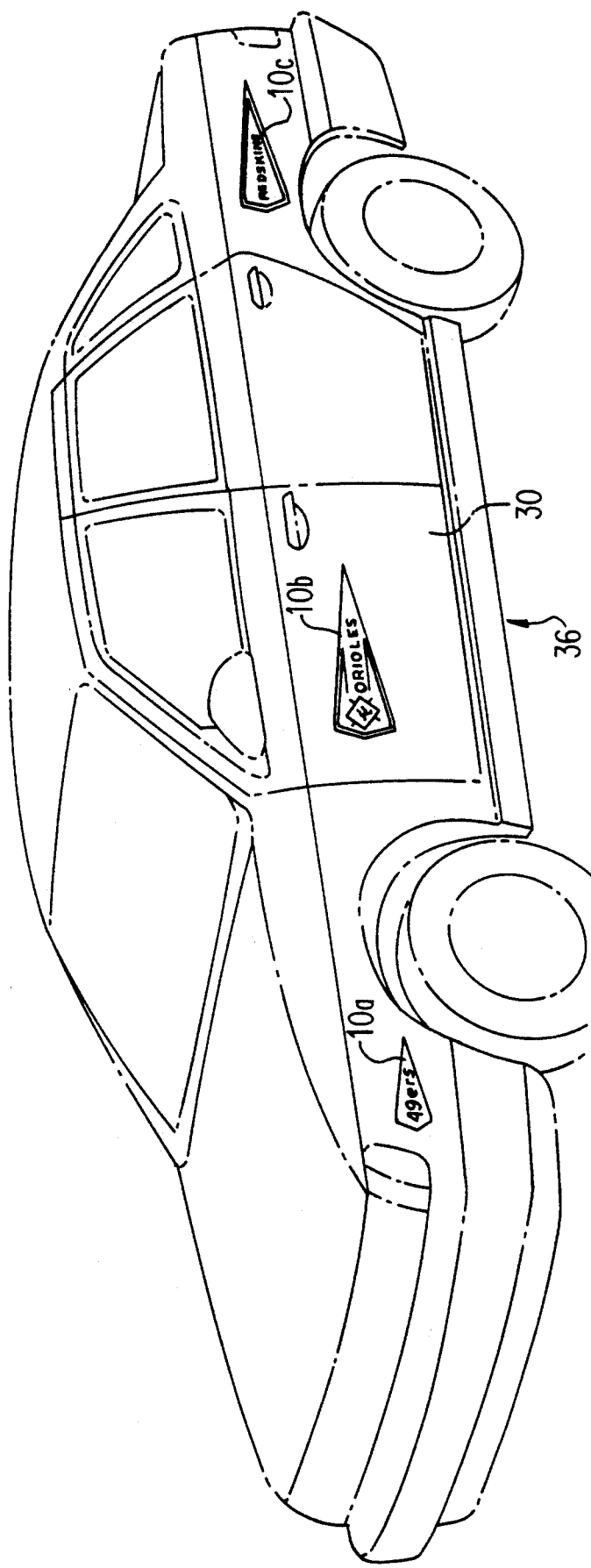
FIG. 9 is a perspective view of a vehicle with banners applied thereto in accordance with the method of the convention.

In use, banners such as 10a, 10b and 10c as shown in FIG. 9 can be attached to the external surface of the vehicle, in the manner described, for display as the vehicle is driven to an athletic event, say. It is assumed that a flagstaff is available from prior use for each banner so that after the vehicle is parked, the banners are easily peeled off the vehicle and each is fastened to a staff in the manner described above. During the event, the banners are waved as much as desired and, following the event, the banners are removed from the staffs and reapplied to the vehicle, it being understood that the operator will have or bring with him a supply of water and the tool 38.

Figure 6:
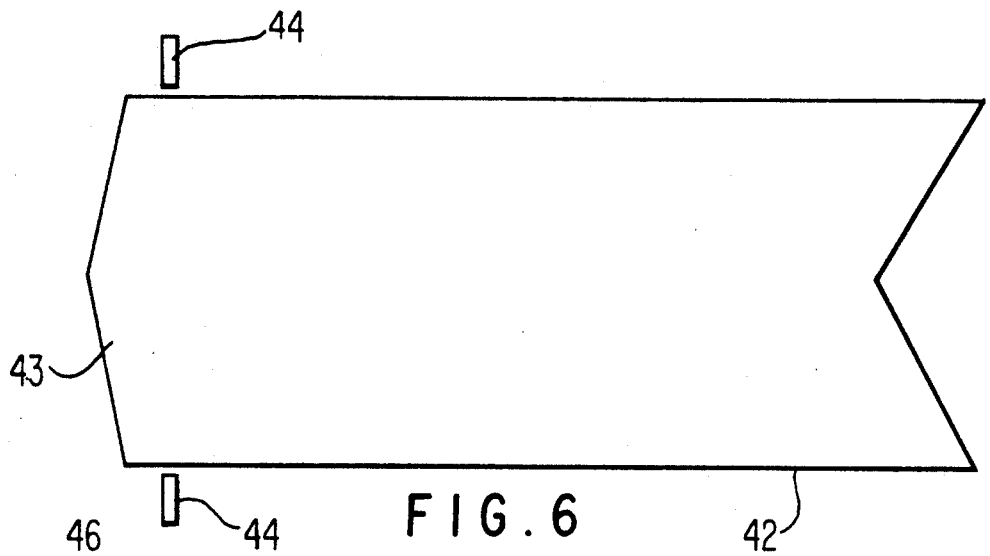
FIGS. 6, 7 and 8 are side elevational views of various types of banners which may be attached either to a flagstaff, or to a exterior surface.

A banner could be of any shape. FIG. 6 illustrates a swallow tail banner 42 having a staff-receiving end part 43 similar to that described for the pennant of FIG. 1. Instead of integral tabs, separate tabs 44 can be supplied for the same purpose.

Figure 7:
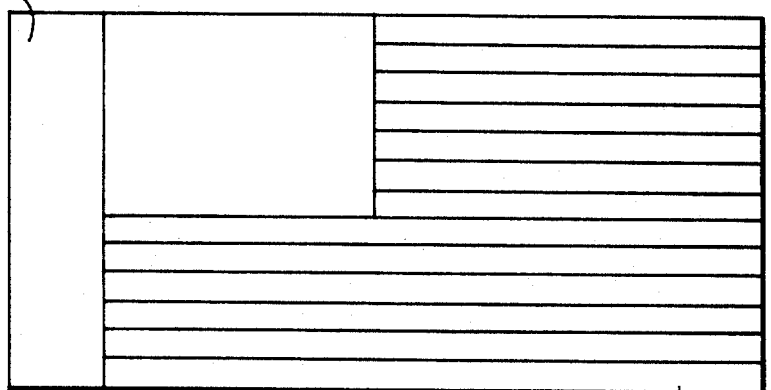

FIG. 7 illustrates a rectangular banner 44 which may be an American flag. The staff attaching end 46 is rectangular and could be transparent so that when the banner is attached to the exterior of a vehicle the end 46 would be substantially undetectable.

Figure 8:
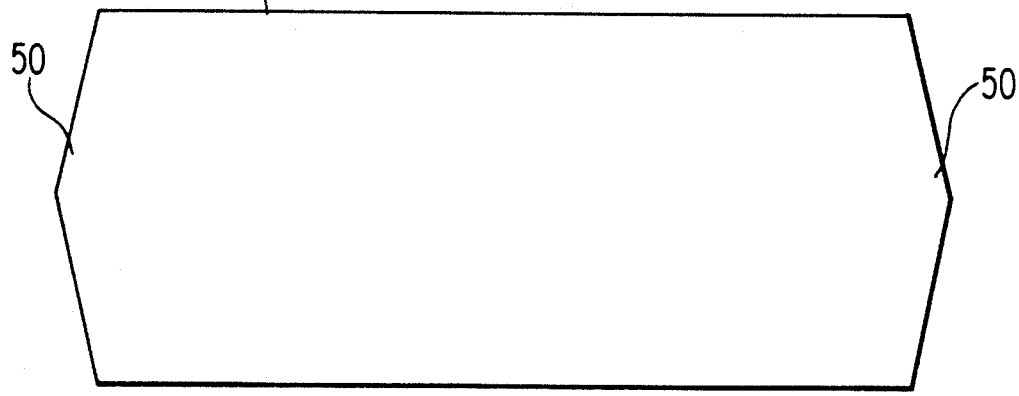

FIG. 8 shows a representative display sign 48 having symmetrical ends 50 and intended primarily for use only on the exterior of a vehicle, though it could also double as a banner. Display signs for automobiles of a material having the characteristics specified above and attached to the vehicle in accordance with the method of the invention have the great advantage that during working hours a vehicle can be used in sales with the product being sold advertised on the display signs. After working hours, the vehicle is quickly converted back to a family car by stripping off the signs which can be readily replaced when the car reverts to a sales vehicle on the following day.

The invention is susceptible of a variety of changes and modifications without, however, departing from the scope and spirit of the appended claims.

What is claimed is:

1. A method of releasably affixing to a flagstaff a banner composed of electrostatically chargeable flexible polymeric sheet material having a surface characteristic such that when one ply of said material is applied to a second ply thereof and the plies manually squeezed together they cling to each other as a result of the inherent cohesiveness in the face-to-face, surfaces comprising the steps of engaging an end part of said banner with a flagstaff, folding said end part over said staff and itself to define a seam encompassing said staff, and thereafter manually squeezing together the overlapping portions of said seam from immediately adjacent said flagstaff transversely over the width of the seam and from top to bottom thereof until said portions of said seam firmly cling to each other without a separate adhesive, and said staff is firmly encased in said seam against movement relative to said banner.

2. The method of claim 1 including the additional steps of manually separating the portions of said seam which cling to each other to separate said banner from said staff, applying water to an area of a smooth nonporous surface equal at least to the area of said banner, applying one surface of said banner to said wetted surface, and thereafter wiping the opposite surface of said banner with a combination electrostatic charging and squeegee tool until said banner material is electrostatically charged, the banner is smooth, all excess water has been squeezed from between said one surface of said banner and said smooth, nonporous surface and said banner adheres to said surface for an indefinite period of time with a strength resistant to a relative wind force of about 100 miles per hour.

3. The method of claim 2 wherein said smooth nonporous surface is an exterior surface of a vehicle.

4. The method of claim 1 including squeezing strips of said sheet material over the upper and lower ends of said seam to reinforce said seam.

* * * * *